US012808321B2

(12) United States Patent
Carballada

(10) Patent No.: US 12,808,321 B2
(45) Date of Patent: Nov. 24, 2026

(54) FREE PISTON ENGINE

(71) Applicant: Manuel Exposito Carballada, Santa Catarina (BR)

(72) Inventor: Manuel Exposito Carballada, Santa Catarina (BR)

( * ) Notice: Subject to any disclaimer, the term of this patent is extended or adjusted under 35 U.S.C. 154(b) by 0 days.

(21) Appl. No.: 19/099,664

(22) PCT Filed: Jul. 28, 2023

(86) PCT No.: PCT/BR2023/050246

§ 371 (c)(1),
(2) Date: Jan. 29, 2025

(87) PCT Pub. No.: WO2024/026550

PCT Pub. Date: Feb. 8, 2024

(65) Prior Publication Data

US 2026/0043344 A1 Feb. 12, 2026

(30) Foreign Application Priority Data

Aug. 3, 2022 (BR) .......................... 1020220153574

(51) Int. Cl.

| | |
|---|---|
| ***F02B 71/00*** | (2006.01) |
| ***F02B 75/22*** | (2006.01) |
| ***F02F 3/28*** | (2006.01) |
| *F02B 75/18* | (2006.01) |

(52) U.S. Cl.

CPC ............ *F02B 71/00* (2013.01); *F02B 75/222* (2013.01); *F02F 3/28* (2013.01); *F02B 2075/1812* (2013.01)

(58) Field of Classification Search

CPC ........ F02B 71/00; F02B 75/222; F02B 75/24; F02B 75/32; F02B 75/22; F02B 2075/1812; F02B 2075/1824; F02F 3/28; F01B 1/06; F01B 1/08; F01B 9/023; F01B 9/06; F03C 1/053; F04B 27/0414; F04B 27/0451; F04B 37/18

See application file for complete search history.

(56) References Cited

U.S. PATENT DOCUMENTS

| | | | |
|---|---|---|---|
| 5,503,038 A | 4/1996 | Aquino | |
| 6,347,574 B1 * | 2/2002 | Guentert | F04B 1/0426 92/72 |
| 8,534,240 B1 | 9/2013 | Waissi | |
| 8,757,126 B2 * | 6/2014 | Sullivan, IV | F02B 75/32 123/197.1 |
| 9,051,833 B2 * | 6/2015 | Diggs | F01B 7/16 |

* cited by examiner

*Primary Examiner* — Grant Moubry

(74) *Attorney, Agent, or Firm* — S.J. INTELLECTUAL PROPERTY LTD.

(57) ABSTRACT

A structural arrangement for an internal combustion engine and/or star shaped air compressor, without a crankshaft and connecting rods and with one or more surrounded pistons, being able to use any fuels in the case of the engine, liquid or gaseous including hydrogen and obtain high thermodynamic efficiency. The engine and/or air compressor has an arrangement that makes it possible to transmit linear movement into circular movement by means of a ring together with an eccentric and with a coupling structure, The structure joins the pistons to the ring, which can be polygonal in the case of the use of at least three pistons or welded in the case of one or two pistons.

4 Claims, 6 Drawing Sheets

YIELD = X/(X+A+B+C)

FREE PISTON ENGINE

TECHNOLOGICAL SECTOR OF THE INVENTION

The present invention belongs to the engine engineering sector, and refers, more specifically, to a structural arrangement for an internal combustion engine and/or star shaped air compressor, without a crankshaft and connecting rods and with one or more surrounded pistons, being able to use any fuels in the case of the engine, liquid or gaseous including hydrogen (aiming to have no emissions with hydrogen) and obtain high thermodynamic efficiency with any fuel.

PRIOR ART

A free piston engine, also known as an opposed piston engine, is a type of internal combustion engine that has a special piston configuration. Unlike conventional piston engines, in which the pistons are connected to a crankshaft, the pistons in a free piston engine move independently, without a direct mechanical connection to the crankshaft.

These engines usually have two pistons moving in opposite directions inside a common cylinder. Each piston has its own combustion chamber and an intake and exhaust valve. Combustion takes place alternately in each chamber, driving the pistons forward and backward.

The main advantage of free piston engines is the elimination of the need for a crankshaft, which reduces mechanical losses and increases efficiency. In addition, these engines have a simpler and more compact design compared to conventional piston engines. They also offer more uniform and smoother combustion, resulting in less vibration and noise.

Another advantage is that these engines can use different types of fuel, including gasoline, diesel, natural gas and even hydrogen. This makes them versatile in terms of fuel options.

However, free piston engines also present significant challenges. One of the main challenges is ensuring proper synchronization of the pistons, to avoid collisions or interference during movement. In addition, combustion rate control and thermal management are critical aspects to ensure the efficient performance and durability of these engines.

But mainly, current free piston engines cannot transmit linear motion directly to the shaft, as they have no means of coupling. Conventional models only transmit force or work through the air they compress themselves or another gas.

Although free piston engines offer some interesting advantages, they are still in the development phase and are not widely used in the automotive industry. However, several companies and researchers continue to explore its potential in search of more efficient and sustainable solutions for vehicle propulsion.

ADVANCES OF THE INVENTION

The present invention relates to an internal combustion engine and/or air compressor which has an arrangement that makes it possible to transmit the linear movement into circular movement by means of a ring together with an eccentric and with a coupling structure; the said structure is what joins the pistons to the ring, which can be polygonal in the case of the use of at least three pistons or welded in the case of one or two pistons involved.

With the arrangement shown, in its different configurations, it achieves greater thermodynamic efficiency with respect to current engines and in absolutely all other aspects too (environmental, mechanical, thermodynamic, economic, consumption etc.), since it also has a much more efficient thermodynamic cycle.

Specifically, the present invention relates to an internal combustion engine and/or air compressor with improved total efficiency, better thermodynamic efficiency, reduced dimensions, longer service life, more power/weight ratio and reduction (even double) of gas emissions to the environment than any other engine, and if it uses hydrogen it would not generate emissions without losing any of the previous characteristics.

BRIEF DESCRIPTION OF THE DRAWINGS

In order that the present invention may be fully understood and put into practice by any technician in this technological sector, it will be described in a clear, concise and sufficient manner, based on the attached drawings, which illustrate and support it, listed below.

DETAILED DESCRIPTION OF THE INVENTION

Figure 1:
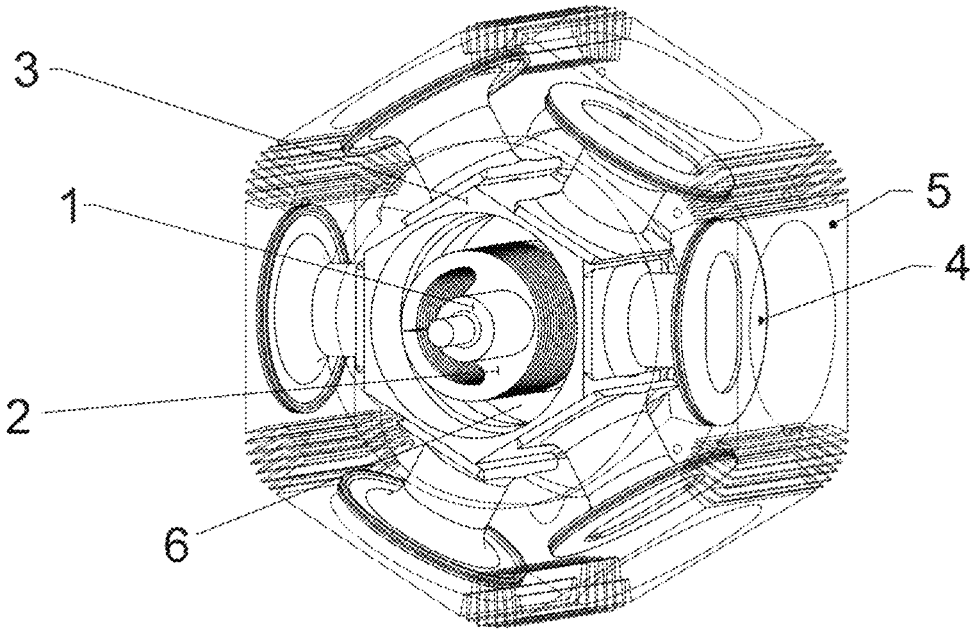
FIG. 1 shows a perspective view of the engine, highlighting the components, exemplified by an arrangement with 6 pistons.
Figure 2:
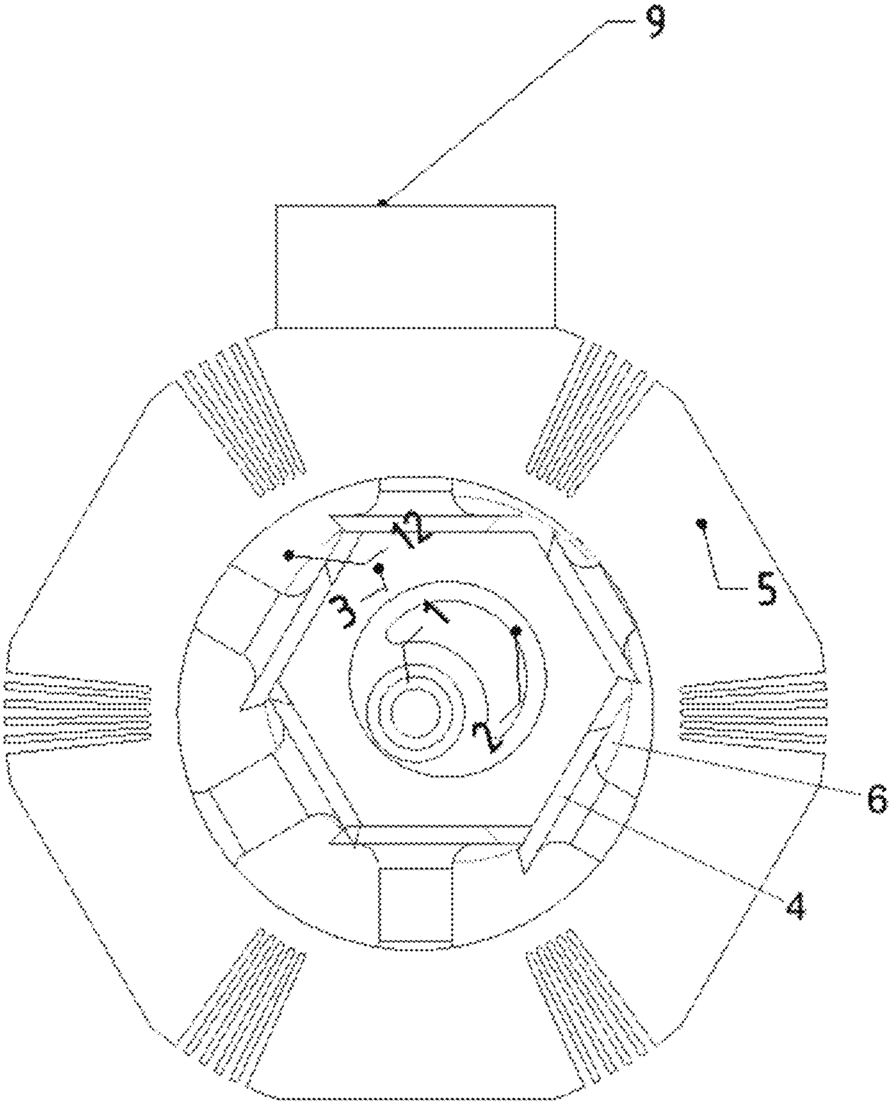
FIG. 2 shows the front view of the engine, highlighting the components, exemplified by an arrangement with 6 pistons.
Figure 3:
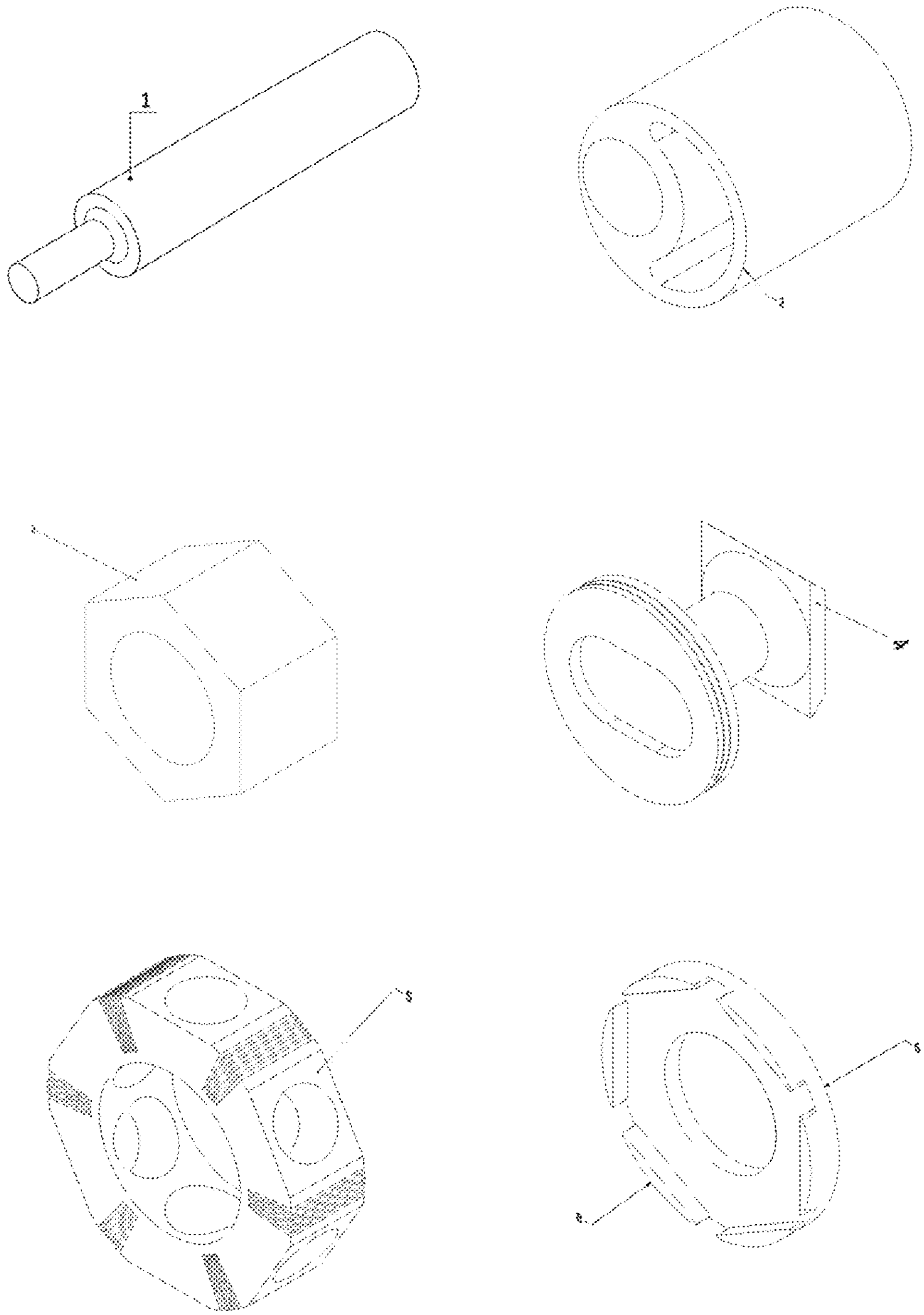
FIG. 3 represents the perspective view of the engine components.

As shown in FIGS. 1 to 3, the combustion engine and/or compressor is formed by an arrangement of three or more pistons (4), which are coupled to the polygonal ring (3) in a sliding manner and limited by the tabs (8) of the clamp (6) mounted on said ring (3); the ring (3) has an eccentric (2) in the center and together they transform the linear movement of the pistons (4) into circular movement on the shaft (1), the shaft (1) being welded or fixed to the eccentric (2). This shaft (1) is through, crosses both sides, where the power and/or work of the engine comes out which is then coupled to one or more external equipment at one or both ends, being closed by two covers (not shown) that serve as support in front of and behind the block (5) for the shaft, this block being the main support structure of the engine.

Alternatively, the polygonal ring (3) which has sides corresponding to the number of pistons (4) may also be cylindrical, having a proportional space for the allocation of components.

The motor shaft (1) rotates together with the eccentric (2). However, during the movement of the shaft (1) plus the eccentric (2) the assembly of the polygonal ring (3) supporting the pistons (4) remains only with a translation movement without rotating, as it is free secured by its inner cylinder to the eccentric and its outer polygon in a sliding way to the pistons (4). The clamp (6) is fixed to the ring (3)

and allows the sliding movement of the pistons (4) as it holds them close to the ring so that they do not remain loose.

In the present invention, the combustion cylinder heads are placed externally in front of the pistons (4) fixed in the block (5) to form the combustion chamber and must include synchronized valves.

Figure 4:
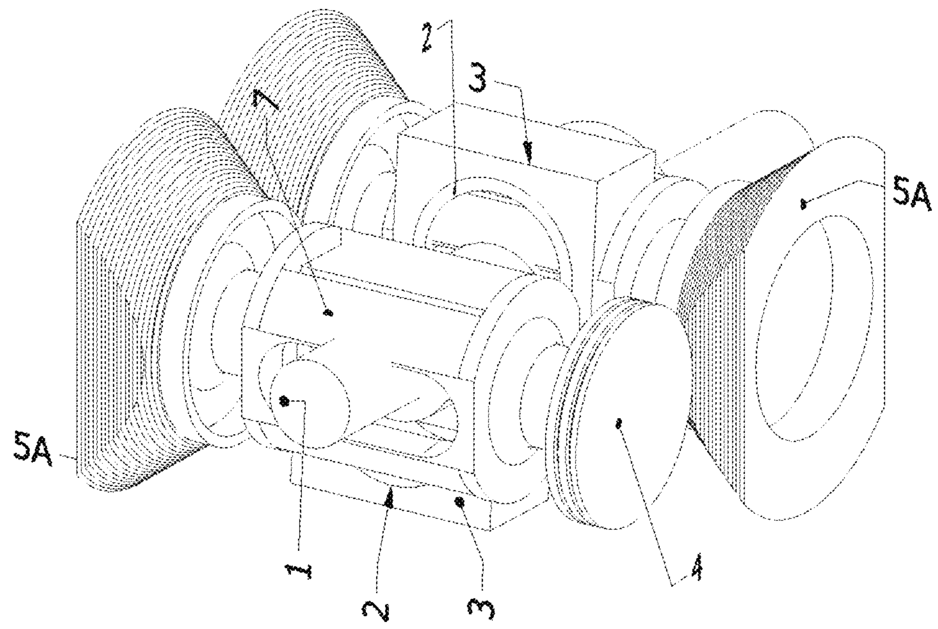
FIG. 4 represents the perspective view of the engine, exemplified by an arrangement of 2 engines, each with 2 pistons around it.
Figure 5:
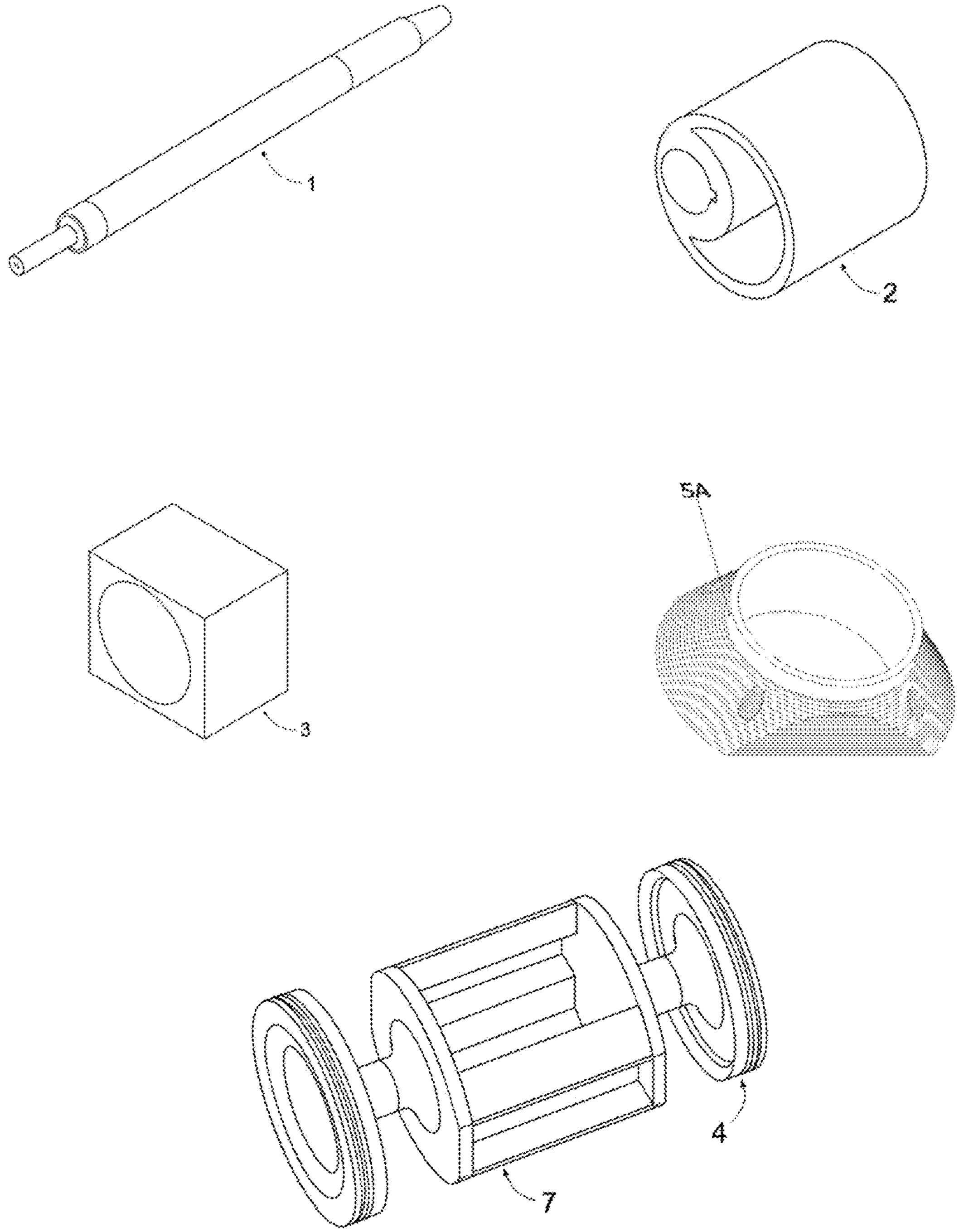
FIG. 5 represents the perspective view of the engine, highlighting the components for a 1 or 2 piston engine arrangement.

As illustrated in FIGS. 4 and 5, alternatively, in an arrangement that contains only one or two pistons, the construction is composed of pistons (4) that are integrated into the blocks (5A), and are welded to a coupling structure (7) which internally receives the four-sided polygonal ring (3) (using only two opposite sides for the pistons to slide) being positioned orthogonally to the shaft (1) joined to the eccentric (2), inserted into the ring (3).

The pistons (4) are mounted in a sliding manner relative to the ring (3), which has four sides, only two opposite sides being used for interaction with the pistons. Sliding occurs in a direct planar manner over the tabs associated with the ring (3), said tabs being introduced into the interior of the ring from opposite sides, comprising one piece arranged at the front side of the ring and another piece arranged at the rear side of the ring. The eccentric (2) is also disposed within the ring (3). The two pistons (4) are guided by the blocks (5A), whose mechanical function is to guide the linear displacement of the pistons through the openings that define the respective cylinders. Furthermore, the pistons (4) are interconnected by a coupling structure (7), which replaces the clamp (6), said structure (7) being fixed, welded, or integrated to the two pistons, thereby forming a single piece.

The pistons (4) transmit their linear movement in a sliding way to the ring (3) which does not only rotate, but also moves, and this ring pushes on the eccentric which rotates inside the ring, converting this linear movement of the pistons (4) into circular movement of the shaft.

Figure 6:
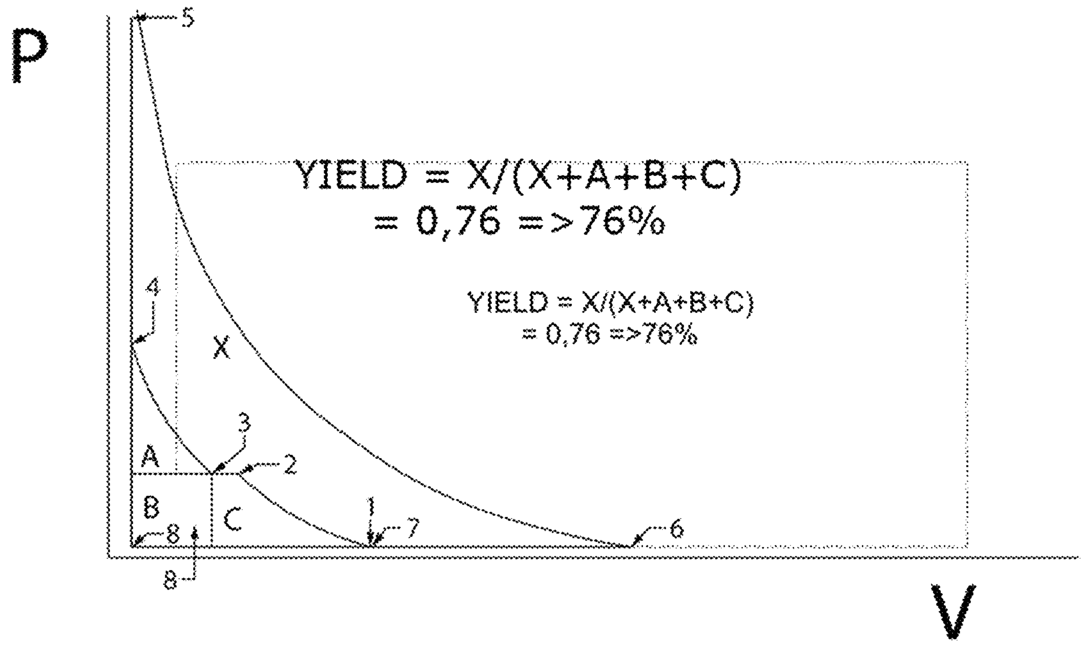
FIG. 6 represents the graph of the P-V (pressure and volume) thermodynamic chart of the engine.

FIG. 6 illustrates the representative theoretical thermodynamic pressure-volume chart in the case of a 4-stroke engine. A technician recognizes that this particular thermodynamic cycle is very efficient, because the values on the chart represent the surfaces of each letter and this is how the yield is theoretically calculated, and this chart is only representative and illustrative.

The structural arrangement presented here provides the technique of an engine in which the first part of the cycle represented in the thermodynamic chart in sequence from point 1 to point 4 simulates the compression in the engine, and occurs in one or more stages (times), with intermediate cooling of the air (see between points 2 and 3 that there is a reduction in volume and constant pressure), If it is more than one stage, then comes the explosion at point 4 and the pressure rises to point 5 with the chamber completely closed to the minimum volume, which increases the pressure to a very high value, and with the high pressure the gases expand to point 6 (which is twice the expansion of current engines) taking full advantage of the amount of energy, which is transmitted to the shaft (1) through the eccentric (2), which from point 6 empties the cylinder of gases completely to point 8, and then filling again to point 6 with new air and fuel, returns to multiple intakes and part of this mixture to point 7 where the valve closes (which is approximately 50% of the volume) to start the cycle again at point 1. The previous description, although for a 4-stroke engine, allows achieving the same yield for a 2-stroke engine where the emptying and filling with new pre-compressed air and fuel from the cylinder is done at once between point 6 and the point 7 on the thermodynamic chart, thus avoiding an extra turn of the shaft in each cycle.

The thermodynamic cycle is very efficient, because the initial compression can be carried out in one or more stages, with intermediate cooling if there is more than one stage, which considerably reduces the work required to carry out the compression, being able to achieve more efficiency to take advantage of the maximum gas energy. However, this engine makes the most of the energy generated by the fuel with minimum waste.

In the design of these engines and/or compressors any of the possible combinations can be used, being able to carry out one or several different sets on the same shaft, as well as varying quantities of pistons.

Last but not least, this engine contributes to the health of the planet, so it can be considered without a doubt, a green invention, as global warming would be reduced in a very high proportion, since there would be a reduction in $CO_2$ levels to the atmosphere and with hydrogen zero emissions. Furthermore, it can be used for motorcycles, cars, boats, airplanes, machinery, power plants etc.

It is important to point out that the figures and descriptions made do not have the effect of limiting the ways of carrying out the inventive concept now proposed, but rather of illustrating and making understandable the conceptual innovations revealed in this solution. Thus, the descriptions and images must be interpreted in an illustrative and non-limiting way, and there may be other equivalent or analogous forms of implementing the inventive concept now revealed and that do not escape the spectrum of protection outlined in the proposed solution.

The invention claimed is:

1. A free piston engine, comprising:

three or more pistons (4) coupled to a polygonal ring (3) in a sliding way and limited by tabs (8) of the staple a clamp (6) mounted on the ring (3);

wherein the ring (3) has an eccentric (2) in a center that together transforms a linear movement of the pistons (4) into circular motion to a shaft (1), and the shaft (1) is welded or fixed to the eccentric (2); the shaft (1) extends longitudinally through the ring center and through the eccentric (2), and the shaft (1) includes two opposite end portions projecting from a front side and a rear side of a block (5) for coupling to one or more external devices; the block (5) includes a front support cover and a rear support cover, each support cover being configured to support the shaft (1), the block (5) constituting a main support structure of the free piston engine.

2. The free piston engine according to claim 1, wherein the polygonal ring (3) comprises a cylindrical internal profile configured to receive the eccentric (2), and an external profile that is polygonal, with sides corresponding to the number of pistons (4), or alternatively cylindrical.

3. The free piston engine according to claim 1, comprising combustion cylinder heads being placed externally in front of the pistons (4) fixed in the block (5) to form a combustion chamber, the combustion cylinder heads including synchronized valves.

4. A free piston engine, formed by an arrangement of one or two pistons (4) which are integrated to blocks (5A), and are fixed, welded or integrated into a coupling structure (7), wherein the coupling structure (7) is configured to receive internally a four-sided polygonal ring (3), in which the pistons (4) slide only through two opposite sides of the four-sided polygonal ring (3), the coupling structure (7) being positioned orthogonally to a shaft (1) joined to an eccentric (2), the eccentric (2) being concentrically disposed within the cylindrical internal profile of the four-sided polygonal ring (3).

* * * * *